United States Patent
Lambright

(10) Patent No.: US 10,268,697 B2
(45) Date of Patent: *Apr. 23, 2019

(54) DISTRIBUTED DEDUPLICATION USING LOCALITY SENSITIVE HASHING

(71) Applicant: Red Hat, Inc., Raleigh, NC (US)

(72) Inventor: Henry Dan Lambright, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,672

(22) Filed: Jun. 8, 2017

(65) Prior Publication Data

US 2017/0270135 A1 Sep. 21, 2017

Related U.S. Application Data

(63) Continuation of application No. 14/337,070, filed on Jul. 21, 2014, now Pat. No. 9,678,976.

(51) Int. Cl.
*G06F 17/30* (2006.01)

(52) U.S. Cl.
CPC ............... *G06F 17/30159* (2013.01)

(58) Field of Classification Search
CPC ................ G06F 17/30159; G06F 3/0608
See application file for complete search history.

(56) References Cited

U.S. PATENT DOCUMENTS

| | | | |
|---|---|---|---|
| 8,452,732 B2 * | 5/2013 | Yakushev | G06F 3/0608 707/654 |
| 9,336,143 B1 | 5/2016 | Wallace et al. | |
| 9,678,976 B2 * | 6/2017 | Lambright | G06F 17/30159 |
| 2012/0198027 A1 * | 8/2012 | Hetzler | G06F 3/0617 709/219 |

* cited by examiner

*Primary Examiner* — Cheryl Lewis
(74) *Attorney, Agent, or Firm* — Lowenstein Sandler LLP

(57) ABSTRACT

Deduplication in a distributed storage system is described. A deduplication manager defines a first extent on a first node in a distributed storage system. The deduplication manager selects a second extent from the one or more groups of extents. The second extent matches the first extent. The deduplication manager removes, from the first extent, one or more data chunks that are included in the second extent. The deduplication manager associates, with the first extent, a pointer to the second extent for the removed one or more data chunks.

20 Claims, 5 Drawing Sheets

300

| c1 | c2 | *c3* | c4 | c5 | c6 | c7 | c8 | c9 | c10 |
|---|---|---|---|---|---|---|---|---|---|
| 302 | 304 | 304 | 308 | 310 | 312 | 314 | 316 | 318 | 320 |

330

| c1 | c2 | *d3* | c4 | c5 | c6 | c7 | c8 | c9 | c10 |
|---|---|---|---|---|---|---|---|---|---|
| 302 | 304 | 334 | 308 | 310 | 312 | 314 | 316 | 318 | 320 |

| c1 | c2 | *c3* | c4 | c5 | c6 | c7 | c8 | c9 | c10 |
|---|---|---|---|---|---|---|---|---|---|
| 352 | 354 | 304 | 356 | 358 | 360 | 362 | 364 | 366 | 368 |

330

| c1 | c2 | *d3* | c4 | c5 | c6 | c7 | c8 | c9 | c10 |
|---|---|---|---|---|---|---|---|---|---|
| 302 | 304 | 334 | 308 | 310 | 312 | 314 | 316 | 318 | 320 |

FIGURE 3B

DISTRIBUTED DEDUPLICATION USING LOCALITY SENSITIVE HASHING

CROSS-REFERENCE TO RELATED APPLICATIONS

This application is a continuation of U.S. patent application Ser. No. 14/337,070 filed Jul. 21, 2014, now U.S. Pat. No. 9,678,976, which is incorporated by reference herein.

TECHNICAL FIELD

Embodiments of the present disclosure relate to deduplication, and more specifically to deduplication in a distributed environment.

BACKGROUND

Data may be stored as unstructured data, for example, in files and directories in a distributed storage system. A distributed storage system may cluster together storage building blocks over a network, aggregate disk and memory resources and manage data in a single global namespace.

BRIEF DESCRIPTION OF THE DRAWINGS

The present invention is illustrated by way of example, and not by way of limitation, and can be more fully understood with reference to the following detailed description when considered in connection with the figures in which:

FIG. 3A illustrates an example extent that may be a candidate for deduplication, in accordance with implementations.

FIG. 3B illustrates an example extent that has been deduplicated, in accordance with implementations.

DETAILED DESCRIPTION

Figure 1:
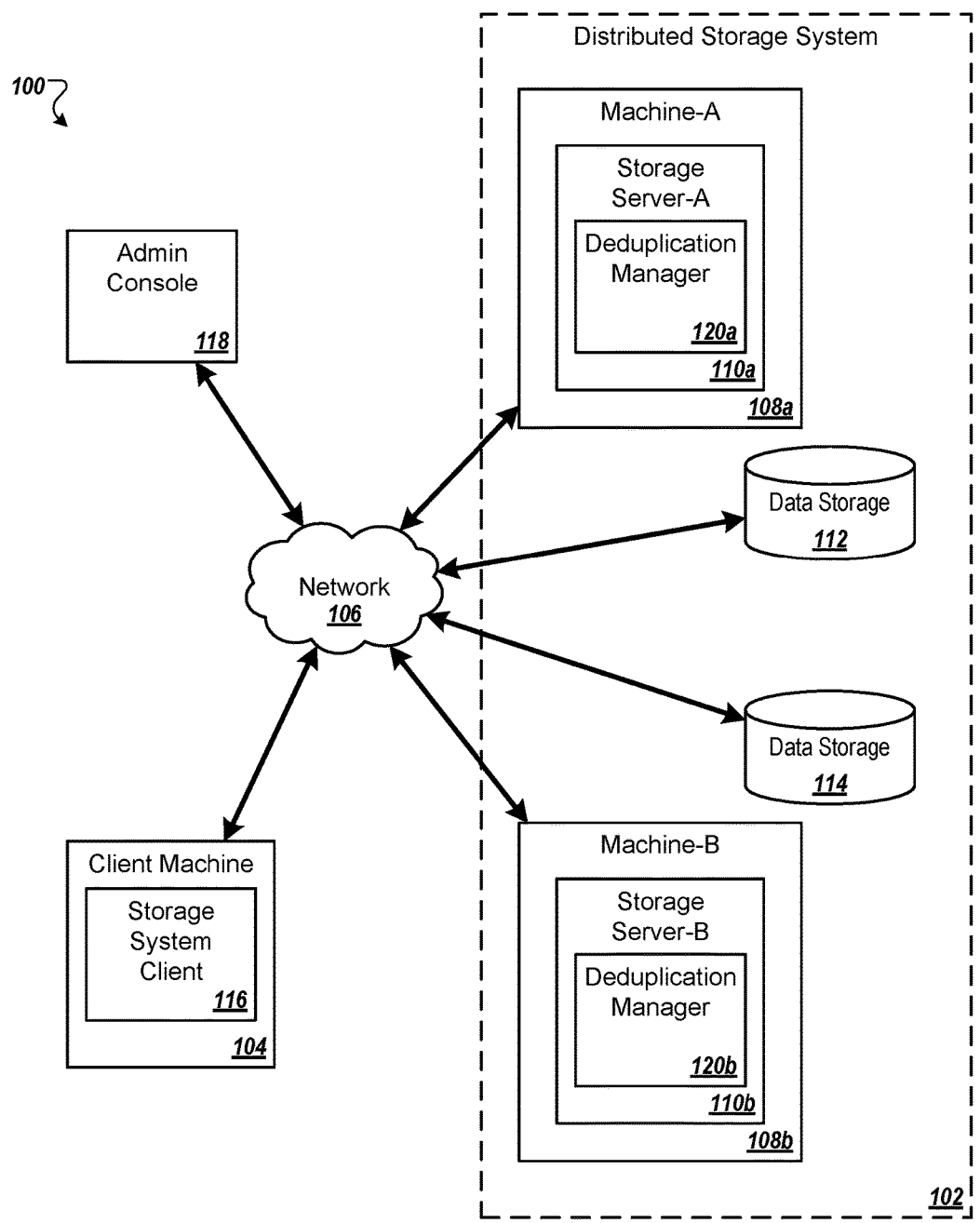
FIG. 1 is a block diagram that illustrates an example system architecture for distributed deduplication in which aspects of the present disclosure may be implemented.

Described herein are methods and systems for deduplication in a distributed environment. Deduplication is a technique for lowering a total cost of ownership for backup and/or archive storage systems by reducing redundant data. Rather than storing multiple copies of the same data within a storage system, a single copy of the data is stored and the other copies can each be replaced with metadata (e.g., a pointer) associated with the "master" copy. Deduplication may also be used to reduce wear of solid-state disks (SSDs) and reduce network overhead used by network transfer protocols.

A distributed environment may be a distributed storage system that includes several server machines that each may store data items. The data item may be a file, block, object, etc. The data items may be divided into chunks, such as fixed sized (e.g., eight kilobytes) chunks or variable sized chunks. Some of the data chunks may be identical and therefore represent redundant data within the distributed environment. The distributed environment may include a deduplication component that identifies redundant data chunks stored throughout the distributed environment, removes all but one of the redundant data chunks, and sets metadata (e.g., pointer, reference) associated with the removed data chunks to point accesses to the remaining data chunks. For example, when the deduplication component identifies eight identical data chunks on various server machines in the distributed environment, the deduplication component may delete seven of the eight data chunks and keep one master data chunk (i.e., the master copy). The deduplication component may also redirect subsequent accesses to the deleted data chunks, such as by setting metadata that points accesses for the deleted seven data chunks to the master eighth data chunk.

Conventionally, each data chunk in a distributed storage system is tracked, such as with metadata. An objective in deduplicating data in a storage system is to reduce the size of the data chunk to be as small as possible, which may result in a higher number of identical data chunks. When identical data chunks in the distributed environment are deduplicated using conventional techniques, metadata (e.g., pointers) may be set for each of the redundant data chunks to direct requests to the master copy, as described above. As data chunk size decreases, the amount of associated metadata may increase. The amount of metadata generated and exchanged between servers to track deleted data chunks under conventional techniques, however, may consume an excessive amount of storage in a distributed storage system and may cause significant network congestion. In some instances, network bandwidth may be consumed by metadata traffic, which may take bandwidth away from other operations. Moreover, if a given data item were to be deduplicated using conventional techniques, the master copies of the data chunks may exist at random locations throughout the distributed environment. For example, a file may be divided into ten data chunks and each data chunk may be stored on a different server. To access (e.g., read, write) the data item, each data chunk is accessed or retrieved, via the network, from each different server. Thus, when using conventional techniques, instead of visiting a single node to retrieve the data item, a large number of different nodes may need to be queried for data chunks of the data item. Accesses for the data item may thus contribute to network traffic and may cause network congestion.

Implementations of the present disclosure address these and other shortcomings by providing more effective mechanisms for data deduplication in a distributed environment. A deduplication manager may handle data deduplication in the distributed environment. The deduplication manager may permit data items to be divided into small data chunks. Rather than indexing the data chunks individually as in conventional approaches, the deduplication manager may define a group of data chunks and associate metadata with the group. A group may be referred to herein as an extent. An extent is a sequentially addressed list of data chunks. The metadata needed to locate a data chunk is related to the number of extents in the distributed environment, rather than the number of data chunks. Thus, if the distributed environment includes 100 chunks per extent, then the amount of metadata in the distributed environment shrinks by a factor of 100, with a corresponding decrease in network overhead. Moreover, data chunks within an extent may all be stored on a single server. Thus, when accessing a data item, fewer nodes may be queried for the same amount of data chunks, as compared to conventional techniques.

In some implementations, two extents that share one identical data chunk are similar enough for deduplication. If a modification was made to one chunk in an extent, that chunk is different and deduplication cannot be performed on that particular chunk, but since the rest of the data chunks remain the same, it may be beneficial to perform deduplication for the data chunks of the extent that are unchanged.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an example system architecture 100 for distributed deduplication in which aspects of the present disclosure may be implemented. The system architecture 100 can include a distributed storage system 102 coupled to one or more client machines 104 via a network 106. The network 106 may be a public network, a private network, or a combination thereof. The distributed storage system 102 can be a network attached storage file system that includes one or more machines 108a-b and one or more mass storage devices, such as magnetic or optical storage based disks 112,114, solid-state drives (SSDs) or hard drives, coupled to the machines 108a-b directly or via the network 106. The machines 108a-b can include, and are not limited to, any data processing device, such as a desktop computer, a laptop computer, a mainframe computer, a personal digital assistant, a server computer, a handheld device or any other device configured to process data.

The distributed storage system 102 can store any number of data items, which may be in any format, such as files, objects, blocks, or any other data structure that is capable of being divided into data chunks. In some implementations, the distributed storage system 102 can store the data items as files and can include directories, which are virtual containers within the distributed storage system 102, in which groups of files and possibly other directories can be kept and organized. The machines 108a-b can include storage servers 110a-b to manage the files and directories in the data stores 112, 114 for a corresponding storage server 110a-b. The data stores 112, 114 can be one or more persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

One or more client machines 104 can include a storage system client 116 to communicate with the storage servers 110a-b in the distributed storage system 102. Storage system client 116 can request access (e.g., e.g., write, modify, truncate, delete) to a file within the distributed storage system 102. Examples of storage system clients 116 can include, and are not limited to, native file system clients and network file system (NFS) clients. "Native" can describe support for specific operating systems. For example, a native file system client may be, and is not limited to, a file system client that supports the Linux operating system. The storage system client 116 can mount the distributed storage system 102 via a mount point to access the data in the distributed storage system 102.

Each server 110 can have a deduplication manager 120 that coordinates deduplication operations within the distributed storage system 102. The deduplication manager 120 identifies a data item (e.g., or a portion of a data item) that may be a candidate for deduplication. For example, the deduplication manager 120 may identify a new data item that enters the distributed storage system 102, such as via storage system client 116. Alternatively, the deduplication manager 120 may identify any data item (or a portion of the data item) that exists on a single node in the distributed storage system 102. In some implementations, the deduplication manager 120 periodically checks existing data items for possible deduplication. The data item may include multiple data chunks, or the deduplication manager 120 may slice the data item into multiple data chunks of any size. In some implementations, the data chunks are small in size to increase a number of possible identical data chunks in the distributed storage system, which may be useful for deduplication. In some implementations, the deduplication manager 120 can be initiated by a system administrator (e.g., via an admin console 118).

In some implementations, the deduplication manager 120 may define a first extent that represents a group of two or more of the data chunks of the data item. An extent may refer to a sequentially addressed list of data chunks. Rather than indexing the data chunks individually as in conventional approaches, the deduplication manager 120 may index the extent, such as by hashing the extent (e.g., creating a sketch) and indexing the hash of the extent in a hash table. The hash table may be accessible to any server (e.g., storage server A 110a, storage server B 110b) in the distributed storage system 102.

The deduplication manager 120 may also identify extents that include similar data chunks and can group the similar extents into a bucket. The deduplication manager 120 may define multiple buckets, where each bucket includes extents that are similar to each other. In some implementations, the deduplication manager 120 uses a hashing algorithm, such as Locality-Sensitive Hashing (LSH) to identify similar extents and to define buckets, as described in further detail in conjunction with FIG. 2.

To deduplicate data chunks from the first extent, the deduplication manager 120 may compare the first extent to other extents (or groups of extents) within the distributed storage system 102. When the deduplication manager 120 finds a second extent that closely matches the first extent, the deduplication manager 120 may remove any data chunks from the first extent that are included in the first extent and the second extent. The deduplication manager 120 may then associate, with the first extent, a pointer to the second extent for the removed data chunk(s). Thus, accesses for the data chunks that were removed from the first extent will be redirected to the corresponding master data chunks in the second extent. Further details of these and other deduplication operations are described in conjunction with FIG. 2.

Figure 2:
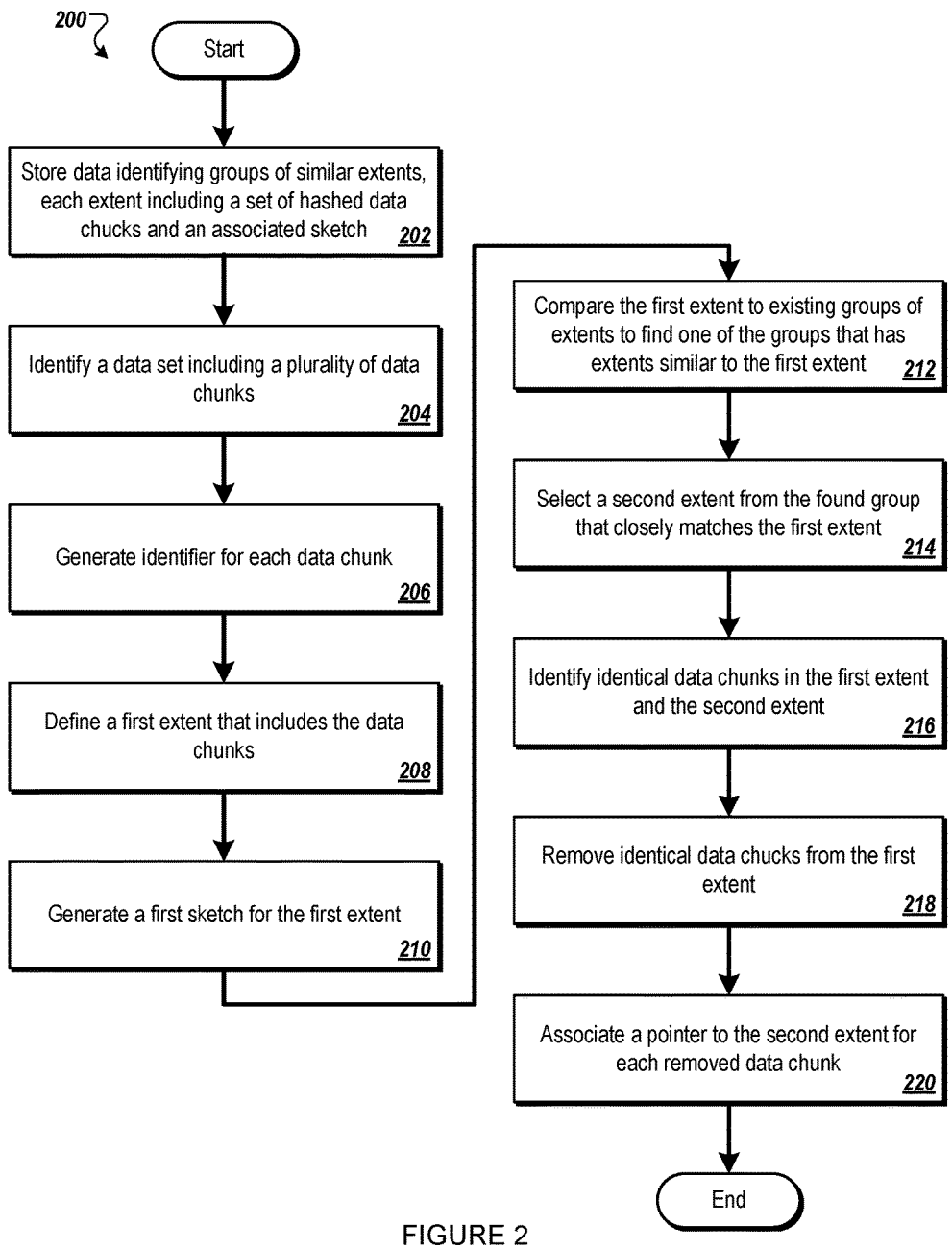
FIG. 2 is a flow diagram of a method for managing data item deduplication in a distributed storage in accordance with some implementations.

FIG. 2 is a flow diagram of a method 200 for managing data item deduplication in a distributed storage in accordance with some implementations. Method 200 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In implementations, method 200 is performed primarily by a deduplication manager 120 of storage server 110 of FIG. 1. For clarity of presentation, the description that follows may use components of system 100 as examples for describing the method 200. However, another system, or combination of systems, may be used to perform the method 200.

For simplicity of explanation, methods described herein are depicted and described as a series of acts. However, acts in accordance with this disclosure can occur in various orders and/or concurrently, and with other acts not presented and described herein. Further, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 2, in one implementation, method 200 begins at block 202 where processing logic stores data identifying groups of similar extents, where each extent includes a set of hashed data chunks. For example, the processing logic may store hash tables that identify data chunks, extents, sketches of extents, buckets of extents, etc.

At block 204, the processing logic identifies a data item that includes a plurality of data chunks. In some implementations, the processing logic can create, define or redefine the size of the data chunks. The data item may be new to the distributed storage system or may be an existing data item that is to be checked for possible deduplication. For a new data item, the processing logic may store the data item in a distributed storage system and then attempt to deduplicate chunks of the data item. Alternatively, the processing logic may store the new data item in a cache or temporary storage while attempting to deduplicate chunks of the data item. Any data chunks that are not removed from the data item as part of the deduplication may then be moved from the cache or temporary storage to the distributed storage system.

At block 206, the processing logic generates an identifier (e.g., a fingerprint, a hash) for each of the data chunks. The identifier may be a small number of bytes that is a probabilistically unique representation of an arbitrarily larger set of data. For example, the processing logic generates a fingerprint for each of the data chunks using a fingerprint algorithm (e.g., SHA256, MD5). For ease in explanation, an identifier for each of the data chunks may be referred to herein as a fingerprint.

At block 208, the processing logic defines a first extent that includes at least a portion of data chunks of a data item. An extent may refer to a fixed-sized subset of a data item, which is made up of data chunks. An extent can be represented by a sketch that is built using a set of data chunk fingerprints. For example, a sketch may be concatenated fingerprints of the data chunks in the extent. The sketch of the extent may be generated by the processing logic at block 210.

At block 212, the processing logic compares the first extent to existing groups of similar extents to find a node associated with a group of extents that has extents similar to the first extent. The group may include any number of extents. The processing logic may find the node using the first extent, such as by using the sketch of the first extent that the processing logic generated at block 210. For example, the processing logic may run the sketch through a set of algorithms that find two data sets that are similar. In some implementations, the set of algorithms may be associated with locality-sensitive hashing (LSH) techniques. The processing logic may run the sketch of the first extent through LSH, which resolves to a node that is associated with the group of extents in a hash table. The group of extents may be referred to as a bucket. Under LSH and other similar sets of algorithms, two similar sketches resolve to the same bucket.

Once the processing logic finds the node which includes at least one extent that is similar to the first extent, the processing logic may select a second extent from the found group of extents at block 214. The second extent may be an extent in the found group that closely matches the first extent. Examples of the first extent and the second extent are further described in conjunction with FIG. 3. When selecting the second extent, the processing logic may also identify a node in the distributed storage system that has the second extent (the extent that closely matches the first extent). The processing logic may use the bucket to identify the node in the distributed storage system that has the second extent. For example, the processing logic may perform a hash on the bucket, where the result of the hash is the node. In some implementations, the node may not store all of the master data chunks. Instead, the node includes information on how to obtain or access the master data chunks. In some implementations, to find where in the distributed storage system 102 the extent is stored, the deduplication manager 120 may perform a LSH function on the extent, which resolves to a bucket within the hash table. The node number may be determined, for example, by performing another hash operation on an identifier for the bucket. For example, the LSH function run on the extent may resolve to a bucket that has an identifier of "A120981." Another hash operation may be performed on the identifier to obtain an identity of a node that either has a similar extent or has information on how to locate the similar extent.

In some implementations, the LSH is vector-based, where the sketch is a vector and each fingerprint is an element of the sketch vector. In other implementations, the LSH is set-based, where the fingerprints are concatenated to form the sketch. In some implementations, the fingerprints in set-based LSH are generated using a min-wise independent permutations locality sensitive hashing (minhash) algorithm. The minhash algorithm finds similar sets of data elements (as opposed to similar vectors) in a given dataset. The data elements can be fingerprints of data chunks.

As an example, when using minhash techniques, each fingerprint may be represented as an n-byte "shingle." For a 128-bit fingerprint, the shingle may be 16 bytes in size. Once a shingle is generated for a fingerprint, the shingle may then be hashed. The hashed single may be smaller in size then the shingle. For example, the hashed shingle may be k number of bits (e.g., k=4 bits). Then, a minhash algorithm may be used to generate a list of random permutations of the shingle hashes (e.g., eight permutations). The random permutations of the shingle hashes may represent some or all of the possible combinations of shingle hashes for the number of bits. For example, when k=4 bits, the set of random permutations may include up to 64 different permutations. The minhash algorithm then compares the different random permutations to estimate similarity between the permutations. The minhash algorithm then identifies the two closest permutations and generates an index of the two closest permutations. The minhash repeats the above operations for each fingerprint to generate an index for each fingerprint. The fingerprint indexes may be concatenated to build the "sketch" described previously.

At block 216, the processing logic identifies identical data chunks in the first extent and the second extent. The processing logic can compare the fingerprints of each chunk to identify the differences between the two extents.

At block 218, the processing logic removes identical data chunks from the first extent. When removing the identical data chunk, the processing logic may remove them from a node on which they are stored. At block 220, the processing logic associates, with the first extent, a pointer or reference to the second extent. In some implementations, the processing logic may store the pointer or references in a hash table.

FIG. 3A illustrates an example extent 300 that may be a candidate for deduplication, in accordance with implementations. Extent 300 may include any number of data chunks of any size. As illustrated, extent 300 includes data chunks 302*a-i* and data chunk 304. During a deduplication operation, the extent 300 may be compared to another similar extent 330. As illustrated, the similar extent 330 includes data chunks 302*a-i* and data chunk 334. When the extent 300 is compared to the similar extent 330 (as further described in conjunction with FIG. 2), it may be determined that extent 300 and similar extent 330 include the same data chunks 302*a-i*. Upon detecting that the extent 300 and similar extent 330 include identical data chunks, the identical data chunks 302*a-i* may be removed from the extent 300, which is illustrated as extent 350 in FIG. 3B. Extent 350 still includes data chunk 304 and no longer includes data chunks 302*a-i*. The data chunks 302*a-i* that were removed from extent 300 may be referred to as duplicate or redundant data chunks. The data chunks 302*a-i* that remain in extent 330 may be referred to as master data chunks 302*a-i*.

Extent 350 also includes pointers or references 352*a-i* to the master data chunks 330*a-i* on extent 330. Thus, when the extent 350 is accessed for a removed data chunk, the extent 350 may point or redirect the access to the master data chunk on extent 330.

Figure 4:
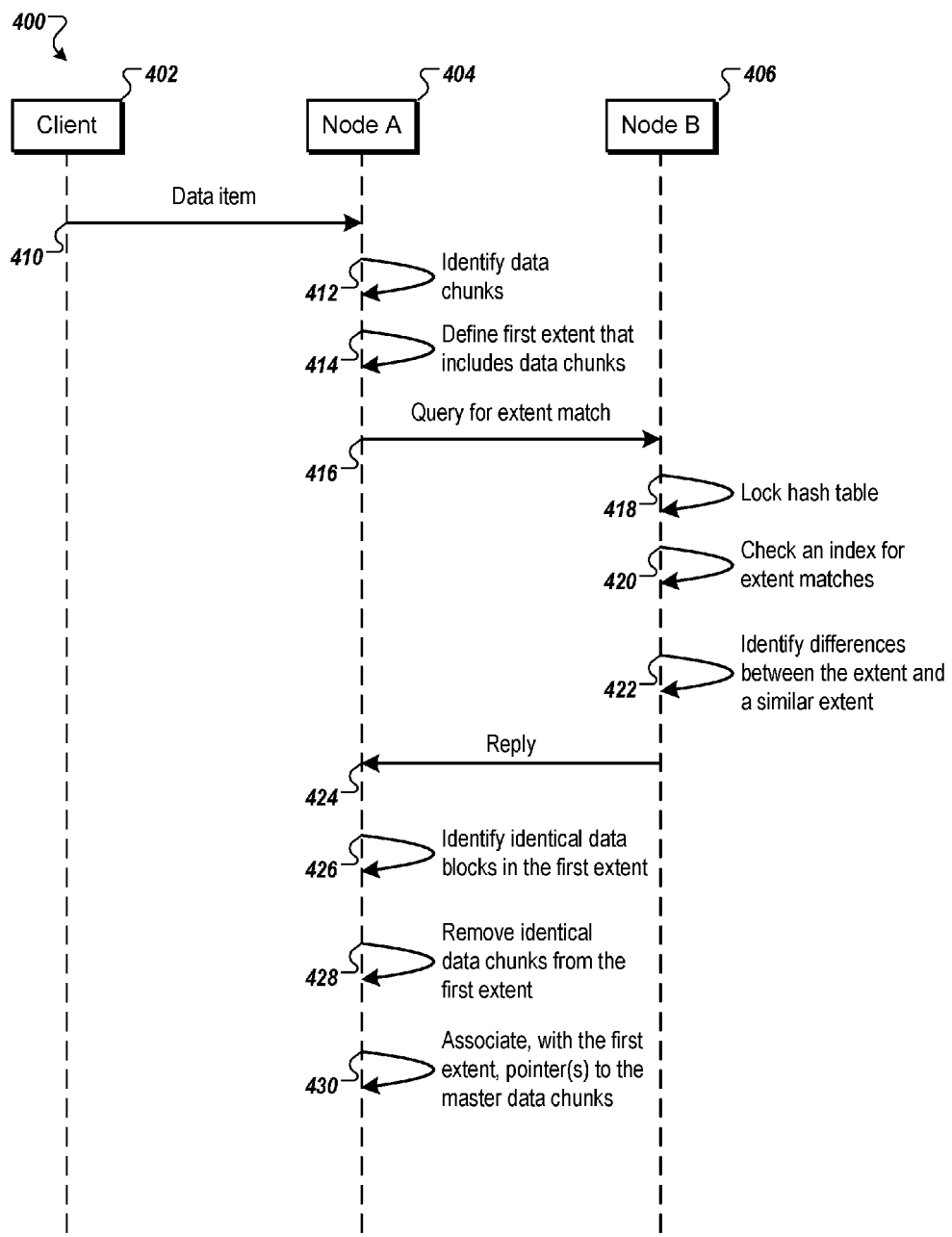
FIG. 4 illustrates an example sequence diagram for deduplication in a distributed storage system in accordance with implementations.

FIG. 4 illustrates an example sequence diagram 400 for deduplication in a distributed storage system in accordance with implementations. The distributed file system can include any number of nodes (e.g., node A 404, node B 406) and can be accessed by any number of clients, one of which can be client 402. In some implementations, client 402 can be client machine 104 of FIG. 1, node A can be storage server A 110*a* of FIG. 1 and node B 306 can be storage server B 110*b* of FIG. 1. In some implementations, node A 404 and node B 406 are subsystems that operate on the same server.

To begin deduplication in the distributed storage system, node A 404 identifies a data item for deduplication. In some implementations, at 410 the distributed storage system may receive a data item from the client 402. In other implementations, node A 404 identifies an existing data item in the distributed storage system.

The node A 404 identifies data chunks of the data item at 412. In some implementations, the node A 404 identifies an undivided data item and divides the data item into multiple data chunks. Alternatively, the node A 404 may identify a data item that has been divided into multiple chunks of a first size. The node A 404 may change the chunk size for each of the multiple chunks. The data chunks may be any size, and can be a variable size or a fixed size.

At 414, the node A 404 defines a first extent that includes at least two of the data chunks. The node A 404 may gather the data chunks and define extents as a foreground process or a background process (e.g., a daemon).

Once the extent is defined, the node A 404 may search within the distributed storage system for other similar extents, as further described in conjunction with FIG. 2. The node A 404 may determine an identity of the node B 406 using LSH techniques, also further described in conjunction with FIG. 2. The node A 404 may query another node B 406 (e.g., a metadata node) for similar extents at 416. The query may be a payload that includes a hash of the extent, a sketch of the extent, all or part of a data item, an offset to define a location of the extent in the data file, a list of fingerprints, etc.

Upon receiving the query, the node B 406 may lock a hash table associated with the extent at 418. In some implementations, the node B 406 locks the entire hash table. In other implementations, the node B 406 locks a row in the hash table that is associated with the extent.

At 420, the node B 406 looks up the extent (e.g., a sketch of the extent) in the hash table. The hash table may include multiple indexed entries, where each entry may be for an extent. An example entry may be as follows: a fingerprint for each data chunk in the extent, where each fingerprint is a 16-byte representation of a single data chunk, a counter for each data chunk that may be toggled when the data chunk is redundant, a source node location for the extent and/or for each data chunk.

When the extent or a representation of the extent is not found in the hash table, the node B 406 may take steps to add the extent to the hash table. When adding the extent to the hash table, the node B 406 may record the sketch of the extent, a source node identifier, a file, an offset, a count of chunks in the extent, fingerprints of each data chunk, etc. Once the node B 406 adds the extent to the hash table, the node B 406 may unlock the hash table and may reply to node A 404 that the extent was not found in the hash table at 426.

When the sketch of the extent is found in the hash table, node B 406 may identify differences between the extent and other similar extents. In some implementations, the node B 406 may identify a counter for each data chunk in the extent. For each matching data chunk, the node B 406 may increment the respective counter (e.g., flip a bit). Once differences in the extent have been identified, the node B 406 may unlock the hash table and send a reply to the node A 404.

At 424, the node A 404 receives the reply from the node B 406. The reply may include a list of data chunks in the extent (e.g., a bitmask) that are redundant and may be deduplicated. At 426, the node A 404 may use the reply from the node B 406 to identify identical data chunks in the extent. At 428, the node A 404 may remove identical data chunks from the extent. At the node A 404 may associate a pointer for the removed data chunks with the extent. In some implementations, the node A 404 may associate a pointer for each removed data chunk. Alternatively, the node A 404 may associate one pointer that references the extent that contains the master copy or copies of any removed data chunks. The pointers may be metadata. The node A 404 may write the data chunks that were not duplicates to a storage (e.g., a server in a distributed storage system, such as described in conjunction with FIG. 1. In some implementations, the node A 404 writes all of the data chunks from an extent to the same storage device, such as the server 110 of FIG. 1.

When the extent does not already exist in the distributed storage system, the node A 404 may write all of the data chunks to one or more storage devices in the distributed storage system.

Figure 5:
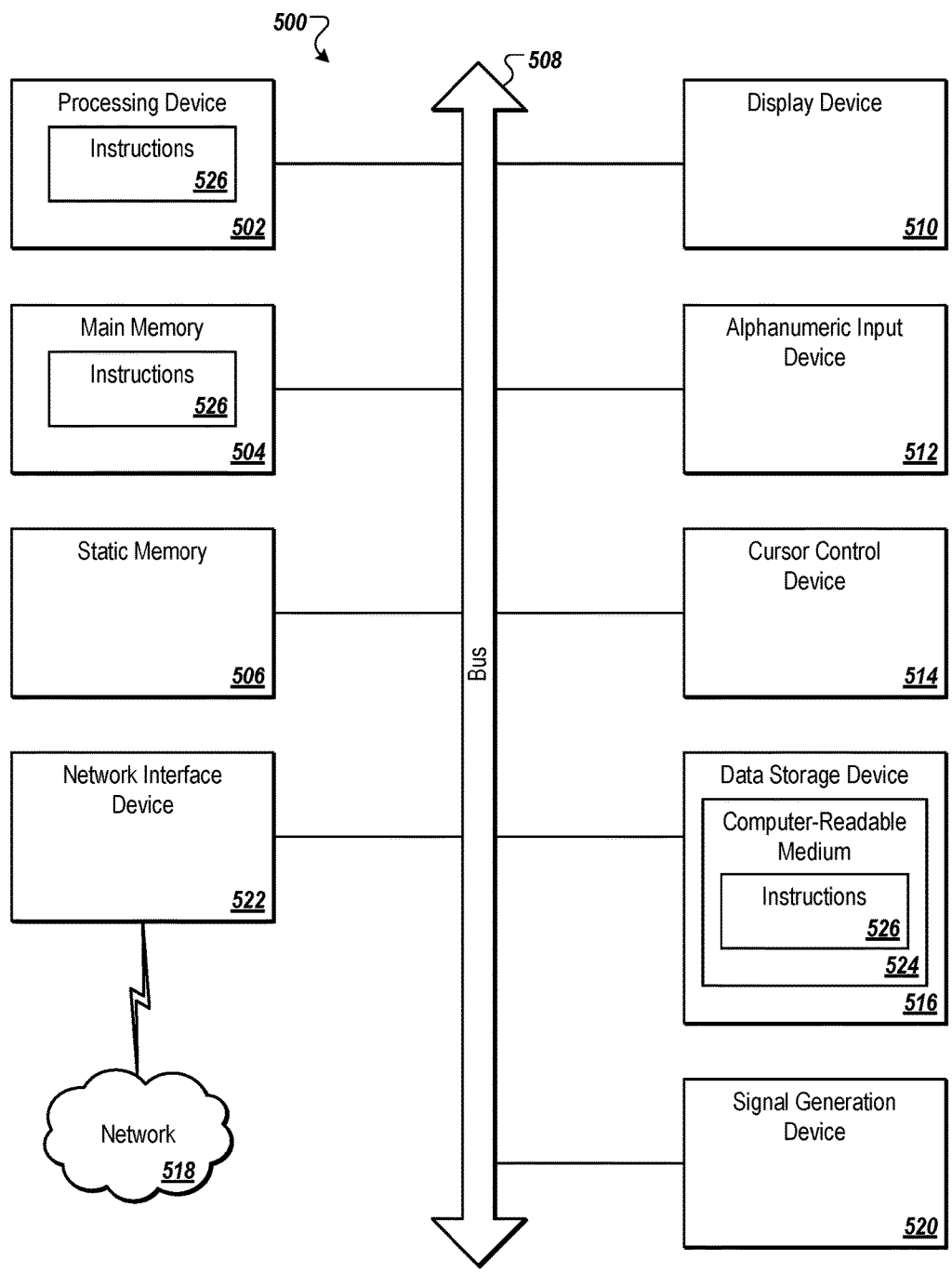
FIG. 5 illustrates a diagrammatic representation of a machine in the example form of a computer system, in accordance with embodiments.

FIG. 5 illustrates a diagrammatic representation of a machine in the example form of a computer system 500 within which a set of instructions, for causing the machine to perform any one or more of the methodologies discussed herein, may be executed. The computer system 500 may correspond to machine 108 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 500 includes a processing device 502, a main memory 505 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 502 may therefore include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include one or more network interface devices 522 (e.g., NICs). The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 526 embodying any one or more of the methodologies or functions described herein (e.g., deduplication manager 120). The instructions 526 may also reside, completely or at least partially, within the main memory 505 and/or within the processing device 502 during execution thereof by the computer system 500; the main memory 505 and the processing device 502 also constituting machine-readable storage media.

While the computer-readable storage medium 524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "probing", "establishing", "detecting", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   defining a first extent on a first node in a distributed storage system;
   selecting a second extent from one or more groups of extents, the second extent matching the first extent;
   removing, by a processing device, from the first extent, one or more data chunks that are included in the second extent; and
   associating, with the first extent, a pointer to the second extent for the removed one or more data chunks.

2. The method of claim 1 further comprising:
   storing an index identifying the one or more groups of extents, wherein the first extent is associated with a first group of the one or more groups, and wherein the second extent is associated with the first group;
   comparing the first extent to one or more of the one or more groups of extents, wherein the comparing comprises:
      identifying the first group in the index using a sketch of the first extent and a locality-sensitive hashing algorithm; and
      identifying the second extent as being associated with the first group.

3. The method of claim 1, further comprising:
   comparing the first extent to one or more of the one or more groups of extents, wherein the comparing comprises:
      querying a node in the distributed storage system for the first extent; and
      receiving an indication from the node that the second extent is similar to the first extent.

4. The method of claim 3, further comprising:
   defining one or more buckets comprising extents that include one or more similar data chunks; and
   identify the node in the distributed storage system to query for the first extent in view of hash of a first bucket of the one or more buckets.

5. The method of claim 1, wherein removing from the first extent one or more data chunks that are included in the second extent comprises comparing fingerprints for each of the plurality of data chunks in the first extent with respective fingerprints for each of the plurality of data chunks in the second extent.

6. The method of claim 1, wherein selecting the second extent from the one or more groups of extents further comprises:
   periodically selecting another extent closely matching the first extent from the one or more groups of extents.

7. The method of claim 1, wherein selecting the second extent from the one or more groups of extents further comprises:
   checking a hash table for the first extent;
   identifying the second extent from the hash table in response to detecting the first extent in the hash table; and
   identifying one or more data chunks that are included in the first extent and the second extent in view of the first extent being detected in the hash table.

8. A computer readable storage medium having instructions that, when executed by a processing device, cause the processing device to perform operations comprising:
   defining a first extent on a first node in a distributed storage system;
   selecting a second extent from one or more group of extents, the second extent matching the first extent;
   removing, from the first extent, one or more data chunks that are included in the second extent; and
   associating, with the first extent, a pointer to the second extent for the removed one or more data chunks.

9. The computer readable storage medium of claim 8, the operations further comprising:
   storing an index identifying the one or more groups of extents, wherein the first extent is associated with a first group of the one or more groups, and wherein the second extent is associated with the first group;
   comparing the first extent to one or more of the one or more groups of extents, wherein the comparing comprises:
      identifying the first group in the index using a sketch of the first extent and a locality-sensitive hashing algorithm; and
      identifying the second extent as being associated with the first group.

10. The computer readable storage medium of claim 8, further comprising:
    comparing the first extent to one or more of the one or more groups of extents, wherein the comparing comprises:
       querying a node in the distributed storage system for the first extent; and
       receiving an indication from the node that the second extent is similar to the first extent.

11. The computer readable storage medium of claim 10, further comprising:
    defining one or more buckets comprising extents that include one or more similar data chunks; and
    identify the node in the distributed storage system to query for the first extent in view of hash of a first bucket of the one or more buckets.

12. The computer readable storage medium of claim 8, wherein removing from the first extent one or more data chunks that are included in the second extent comprises comparing fingerprints for each of the plurality of data chunks in the first extent with respective fingerprints for each of the plurality of data chunks in the second extent.

13. The computer readable storage medium of claim 8, wherein selecting the second extent from the one or more groups of extents further comprises:
    checking a hash table for the first extent;

identifying the second extent from the hash table in response to detecting the first extent in the hash table; and identifying one or more data chunks that are included in the first extent and the second extent in view of the first extent being detected in the hash table.

14. A computing device comprising:

a memory; and a processing device coupled to the memory, the processing device to:

define a first extent on a first node in a distributed storage system;

select a second extent from one or more groups of extents, the second extent matching the first extent;

remove, from the first extent, one or more data chunks that are included in the second extent; and associate, with the first extent, a pointer to the second extent for the removed one or more data chunks.

15. The computing device of claim 14, the processing device further to:

store an index identifying the one or more groups of extents, wherein the first extent is associated with a first group of the one or more groups, and wherein the second extent is associated with the first group;

compare the first extent to one or more of the one or more groups of extents, wherein the comparing comprises:

identify the first group in the index using a sketch of the first extent and a locality-sensitive hashing algorithm; and identify the second extent as being associated with the first group.

16. The computing device of claim 14, the processing device further to:

compare the first extent to one or more of the one or more groups of extents, wherein the comparing comprises:

query a node in the distributed storage system for the first extent; and receive an indication from the node that the second extent is similar to the first extent.

17. The computing device of claim 16, the processing device further to:

define one or more buckets comprising extents that include one or more similar data chunks; and identify the node in the distributed storage system to query for the first extent in view of hash of a first bucket of the one or more buckets.

18. The computing device of claim 14, wherein removing from the first extent one or more data chunks that are included in the second extent comprises comparing fingerprints for each of the plurality of data chunks in the first extent with respective fingerprints for each of the plurality of data chunks in the second extent.

19. The computing device of claim 14, wherein selecting the second extent from the one or more groups of extents further comprises:

periodically selecting another extent closely matching the first extent from the one or more groups of extents.

20. The computing device of claim 14, wherein selecting the second extent from the one or more groups of extents, the processing device further to:

check a hash table for the first extent;

identify the second extent from the hash table in response to detecting the first extent in the hash table; and identify one or more data chunks that are included in the first extent and the second extent in view of the first extent being detected in the hash table.

* * * * *